(12) United States Patent
Warner et al.

(10) Patent No.: US 10,971,928 B2
(45) Date of Patent: Apr. 6, 2021

(54) INTEGRATED OVERVOLTAGE PROTECTION AND MONITORING SYSTEM

(71) Applicant: RAYCAP IP ASSETS LTD, Nicosia (CY)

(72) Inventors: Shawn Warner, Rathdrum, ID (US); Michael Bloxham, Mead, WA (US); Louie Mysse, Coeur D'Alene, ID (US); Jonathan Martinez, Spokane Valley, WA (US)

(73) Assignee: RAYCAP IP ASSETS LTD, Strovolos (CY)

( * ) Notice: Subject to any disclaimer, the term of this patent is extended or adjusted under 35 U.S.C. 154(b) by 311 days.

(21) Appl. No.: 16/115,449

(22) Filed: Aug. 28, 2018

(65) Prior Publication Data

US 2020/0076187 A1 Mar. 5, 2020

(51) Int. Cl.
| | |
|---|---|
| *H02H 9/04* | (2006.01) |
| *H01Q 1/50* | (2006.01) |
| *H01T 4/08* | (2006.01) |
| *G02B 6/44* | (2006.01) |
| *H01T 4/02* | (2006.01) |

(52) U.S. Cl.
CPC ............ *H02H 9/04* (2013.01); *G02B 6/4452* (2013.01); *G02B 6/4472* (2013.01); *H01Q 1/50* (2013.01); *H01T 4/02* (2013.01); *H01T 4/08* (2013.01)

(58) Field of Classification Search
CPC ....... H02H 9/04; G02B 6/4452; G02B 6/4472
See application file for complete search history.

(56) References Cited

U.S. PATENT DOCUMENTS

| | | |
|---|---|---|
| 3,066,181 A | 11/1962 | Flower |
| 3,165,372 A | 1/1965 | Jacobs |
| 3,247,479 A | 4/1966 | Knipping |

(Continued)

FOREIGN PATENT DOCUMENTS

| | | |
|---|---|---|
| CH | 698717 B1 | 10/2009 |
| DE | 20 2005 021740 U1 | 8/2009 |

(Continued)

OTHER PUBLICATIONS

"Relay" from Wikipedia. Downloaded Oct. 30, 2009.

(Continued)

*Primary Examiner* — Scott Bauer
(74) *Attorney, Agent, or Firm* — Schwabe Williamson & Wyatt, PC

(57) ABSTRACT

A remote suppression unit retains a first set of surge suppression modules. A base suppression unit retains a second set of surge suppression modules. An over voltage protection (OVP) board in the remote suppression unit includes power strips that couple the first set of surge suppression modules to remote ends of DC power cables. A configurable terminal assembly in the base suppression unit couples the second set of suppression modules to local ends of the DC power cables. The surge suppression modules in combination with the OVP board and terminal assembly provide more suppression protection in both the remote and base suppression units. A remote voltage monitor circuit in the remote suppression unit measures voltages on remote ends of the DC power cables and transmits the voltages and alarm status to a monitor circuit in the base suppression unit.

22 Claims, 12 Drawing Sheets

(56) References Cited

U.S. PATENT DOCUMENTS

| | | | |
|---|---|---|---|
| 3,659,189 A | 4/1972 | Kiviranna | |
| 3,659,277 A | 4/1972 | Brown | |
| 3,876,076 A | 4/1975 | Hazelhurst | |
| 3,976,351 A | 8/1976 | Hopfe | |
| 4,030,061 A | 6/1977 | Gaskell | |
| 4,236,190 A | 11/1980 | Hollingsead | |
| 4,918,565 A | 4/1990 | King | |
| 4,976,508 A | 12/1990 | Okura | |
| 5,030,128 A | 7/1991 | Herron | |
| 5,311,397 A | 5/1994 | Harshberger | |
| D361,314 S | 8/1995 | Ryan | |
| D362,232 S | 9/1995 | Ryan | |
| 5,473,718 A | 12/1995 | Sommer | |
| 5,491,766 A | 2/1996 | Huynh | |
| 5,530,215 A | 6/1996 | Couvreur | |
| 5,555,153 A | 9/1996 | Frederiksen | |
| 5,602,532 A | 2/1997 | Ryan | |
| 5,627,721 A | 5/1997 | Figueiredo | |
| 5,651,698 A | 7/1997 | Locati | |
| 5,701,227 A | 12/1997 | Ryan | |
| 5,717,685 A | 2/1998 | Abraham | |
| 5,790,360 A | 8/1998 | Ryan | |
| 5,805,757 A | 9/1998 | Bloom | |
| 5,903,693 A | 5/1999 | Brown | |
| 5,914,845 A | 6/1999 | Chase | |
| 5,953,193 A | 9/1999 | Ryan | |
| 5,966,282 A | 10/1999 | Ryan | |
| 5,969,932 A | 10/1999 | Ryan | |
| 6,031,706 A | 2/2000 | Nabell | |
| 6,037,544 A | 3/2000 | Lee | |
| 6,038,119 A | 3/2000 | Atkins | |
| 6,074,247 A | 6/2000 | Hall | |
| 6,114,632 A | 9/2000 | Planas, Sr. | |
| 6,122,156 A | 9/2000 | Nabell | |
| 6,125,048 A | 9/2000 | Loughran | |
| 6,389,214 B1 | 5/2002 | Smith | |
| 6,418,262 B1 | 7/2002 | Puetz | |
| 6,430,020 B1 | 8/2002 | Atkins | |
| 6,501,634 B1 * | 12/2002 | Hubbell | H01H 85/44 |
| | | | 361/103 |
| 6,535,369 B1 | 3/2003 | Redding | |
| 6,556,402 B2 | 4/2003 | Kizis | |
| 6,623,315 B1 | 9/2003 | Roderick | |
| 6,636,409 B2 * | 10/2003 | Kladar | H01C 7/12 |
| | | | 361/104 |
| 6,640,111 B1 | 10/2003 | Shapira | |
| 6,654,223 B1 | 11/2003 | Bippus | |
| 6,715,619 B2 | 4/2004 | Kim | |
| 6,719,615 B1 | 4/2004 | Molnar | |
| 6,729,902 B2 | 5/2004 | Martich | |
| 6,738,555 B1 | 5/2004 | Cooke | |
| 6,748,155 B2 | 6/2004 | Kim | |
| 6,763,171 B2 | 7/2004 | D'Inca | |
| 6,771,861 B2 | 8/2004 | Wagner | |
| 6,792,190 B2 | 9/2004 | Xin | |
| 6,804,447 B2 | 10/2004 | Smith | |
| 6,809,258 B1 | 10/2004 | Dang | |
| 6,813,510 B1 | 11/2004 | Kunzinger | |
| 6,851,966 B1 | 2/2005 | Tomasino | |
| 6,876,533 B1 | 4/2005 | Ryan | |
| 6,937,807 B2 | 8/2005 | Franklin | |
| 7,008,256 B2 | 3/2006 | Poiraud | |
| 7,035,073 B2 | 4/2006 | Bennett | |
| 7,228,047 B1 | 6/2007 | Szilagyi | |
| 7,218,828 B2 | 8/2007 | Feustel | |
| 7,302,149 B2 | 11/2007 | Swam | |
| 7,327,926 B2 | 2/2008 | Barth | |
| 7,376,322 B2 | 5/2008 | Zimmel | |
| 7,397,673 B1 | 7/2008 | Wilson | |
| 7,433,169 B2 | 10/2008 | Kamel | |
| 7,460,381 B2 | 12/2008 | Lanni | |
| 7,508,687 B2 | 3/2009 | Manolescu | |
| 7,526,174 B2 | 4/2009 | Leon | |
| 7,664,363 B1 | 2/2010 | Mowery, Sr. | |
| 7,739,522 B2 | 6/2010 | Festo | |
| 7,768,794 B1 | 8/2010 | Wilson | |
| RE41,655 E | 9/2010 | Woodhead | |
| 7,873,252 B2 | 1/2011 | Smrha | |
| 7,894,782 B2 | 2/2011 | Rofougaran | |
| 7,946,863 B2 | 5/2011 | Loch | |
| 7,949,315 B2 | 5/2011 | Rofougaran | |
| 7,972,067 B2 | 7/2011 | Haley | |
| 8,021,189 B2 | 9/2011 | Zayas | |
| 8,111,966 B2 | 2/2012 | Holmberg | |
| 8,121,457 B2 | 2/2012 | Zimmel | |
| 8,180,192 B2 | 5/2012 | Zimmel | |
| 8,279,067 B2 | 10/2012 | Berger | |
| 8,383,521 B2 | 2/2013 | Nishimura et al. | |
| 8,401,497 B2 | 3/2013 | Rofougaran | |
| 8,401,501 B2 | 3/2013 | Rofougaran | |
| 8,412,385 B2 | 4/2013 | Brumett, Jr. | |
| 8,457,461 B2 | 6/2013 | Ott | |
| 8,467,655 B2 | 6/2013 | German | |
| 8,490,799 B2 | 7/2013 | Knight | |
| 8,521,100 B2 | 8/2013 | Rofougaran | |
| 8,620,549 B2 | 8/2013 | Rofougaran | |
| 8,526,200 B2 | 9/2013 | Miller | |
| 8,526,893 B2 | 9/2013 | Rofougaran | |
| 8,547,164 B2 | 10/2013 | Flores | |
| 8,566,627 B2 | 10/2013 | Halepete | |
| 8,577,359 B2 | 11/2013 | Wesby | |
| 8,588,606 B2 | 11/2013 | Watte | |
| 8,600,318 B2 | 12/2013 | Rofougaran | |
| 8,730,639 B1 | 5/2014 | Wilson | |
| 8,754,622 B2 | 6/2014 | Dobkin | |
| 8,780,519 B2 | 7/2014 | Miller | |
| 8,810,990 B1 | 8/2014 | Miller | |
| 8,831,395 B2 | 9/2014 | Sievers | |
| 8,839,594 B2 | 9/2014 | Smith | |
| 8,873,926 B2 | 10/2014 | Beamon | |
| 8,938,143 B2 | 1/2015 | Do | |
| 8,989,548 B2 | 3/2015 | Kopf | |
| 8,995,106 B2 | 3/2015 | Miller | |
| 9,049,500 B2 | 6/2015 | Conner | |
| 9,057,862 B2 | 6/2015 | Strasser | |
| 9,099,860 B2 | 8/2015 | Martinez | |
| 9,140,872 B2 | 9/2015 | Sedor | |
| 9,179,500 B2 | 11/2015 | Yu | |
| 9,281,866 B2 | 3/2016 | Smentek | |
| 9,448,576 B2 | 9/2016 | Chamberlain | |
| 9,575,277 B2 | 2/2017 | Bakatsias | |
| 9,640,986 B2 | 5/2017 | Politis | |
| 9,673,904 B2 | 6/2017 | Palanisamy | |
| 10,027,108 B2 * | 7/2018 | Peach | H02H 3/048 |
| 10,429,604 B2 | 10/2019 | Bakatsias | |
| 2001/0053971 A1 | 12/2001 | Demetrescu | |
| 2002/0048133 A1 * | 4/2002 | Jakwani | H01T 4/06 |
| | | | 361/118 |
| 2002/0055306 A1 | 5/2002 | Jenks | |
| 2002/0150372 A1 | 10/2002 | Schray | |
| 2002/0196593 A1 | 12/2002 | Kizis | |
| 2003/0027521 A1 | 2/2003 | Yip | |
| 2003/0085621 A1 | 5/2003 | Potega | |
| 2003/0113086 A1 | 6/2003 | Jun | |
| 2003/0148668 A1 | 8/2003 | Lias | |
| 2004/0119386 A1 | 6/2004 | Guidez | |
| 2004/0198451 A1 | 10/2004 | Varghese | |
| 2004/0246693 A1 | 12/2004 | Lloyd | |
| 2005/0036262 A1 | 2/2005 | Siebenthall | |
| 2005/0042920 A1 | 2/2005 | Poiraud | |
| 2005/0094359 A1 | 5/2005 | Lee | |
| 2005/0157461 A1 | 7/2005 | Cauthron | |
| 2005/0231872 A1 | 10/2005 | Schimanski | |
| 2006/0139836 A1 | 6/2006 | Anthony | |
| 2006/0153362 A1 | 7/2006 | Bloodworth | |
| 2007/0024372 A1 | 2/2007 | Hagen | |
| 2007/0093204 A1 | 4/2007 | Kincard | |
| 2007/0163801 A1 | 7/2007 | Coffey | |
| 2007/0217101 A1 | 9/2007 | Carter | |
| 2008/0037188 A1 | 2/2008 | Wilson | |
| 2008/0106881 A1 | 5/2008 | Tari | |
| 2008/0117555 A1 | 5/2008 | Wilson | |
| 2008/0139045 A1 | 6/2008 | Ho | |
| 2008/0186667 A1 | 8/2008 | Verdiell | |

(56) References Cited

U.S. PATENT DOCUMENTS

| | | |
|---|---|---|
| 2008/0247112 A1 | 10/2008 | Benedetto |
| 2008/0272654 A1 | 11/2008 | Lontka |
| 2008/0278889 A1 | 11/2008 | Briggs |
| 2008/0298762 A1 | 12/2008 | Hawley |
| 2008/0310060 A1 | 12/2008 | Metral |
| 2009/0103218 A1 | 4/2009 | Ryan |
| 2009/0103881 A1 | 4/2009 | Gonzalez |
| 2009/0226143 A1 | 9/2009 | Beck |
| 2009/0238531 A1 | 9/2009 | Holmberg |
| 2009/0257727 A1 | 10/2009 | Laurisch |
| 2010/0034507 A1 | 2/2010 | Sielaff |
| 2010/0054676 A1 | 3/2010 | Cooke |
| 2010/0181840 A1 | 7/2010 | Coulson |
| 2010/0259871 A1 | 10/2010 | Ewing |
| 2011/0101937 A1 | 5/2011 | Dobkin |
| 2011/0135316 A1 | 6/2011 | Fankhauser |
| 2011/0237299 A1 | 9/2011 | Boss |
| 2012/0043432 A1 | 2/2012 | Heitmeyer |
| 2012/0051710 A1 | 3/2012 | Zeng |
| 2012/0069882 A1 | 3/2012 | Nino |
| 2012/0092835 A1 | 4/2012 | Miller |
| 2012/0114295 A1 | 5/2012 | Guzzo |
| 2012/0200978 A1 | 8/2012 | Miller |
| 2012/0200979 A1 | 8/2012 | Miller |
| 2012/0230636 A1 | 9/2012 | Blockley |
| 2012/0269509 A1 | 10/2012 | Hultermans |
| 2012/0317426 A1 | 12/2012 | Hunter, Jr. |
| 2012/0319485 A1 | 12/2012 | Ewing |
| 2013/0003677 A1 | 1/2013 | Yu |
| 2013/0039629 A1 | 2/2013 | Krampotich |
| 2013/0051440 A1 | 2/2013 | Rofougaran |
| 2013/0084050 A1 | 4/2013 | Vastmans |
| 2013/0114930 A1 | 5/2013 | Smith |
| 2013/0146355 A1 | 6/2013 | Strasser |
| 2013/0170801 A1 | 7/2013 | Do |
| 2013/0215804 A1 | 8/2013 | Lu |
| 2013/0294735 A1 | 11/2013 | Burris |
| 2013/0308915 A1 | 11/2013 | Buff |
| 2013/0340361 A1 | 12/2013 | Rogers |
| 2014/0168842 A1 | 6/2014 | Martinez |
| 2014/0219622 A1 | 8/2014 | Coan |
| 2014/0248028 A1 | 9/2014 | Campbell |
| 2014/0314388 A1 | 10/2014 | Alberts et al. |
| 2014/0376909 A1 | 12/2014 | Frisken |
| 2015/0006095 A1 | 1/2015 | Voisine |
| 2015/0109710 A1 | 4/2015 | Politis |
| 2015/0155669 A1 | 6/2015 | Chamberlain |
| 2015/0155706 A1 | 6/2015 | Miller |
| 2015/0168974 A1 | 6/2015 | Mascarenhas |
| 2015/0234399 A1 | 8/2015 | Chamberlain |
| 2015/0234405 A1 | 8/2015 | Chamberlain |
| 2015/0334476 A1 | 11/2015 | Smith |
| 2016/0043806 A1 | 2/2016 | Maricevic |
| 2016/0139355 A1 | 5/2016 | Petersen |
| 2016/0231524 A1 | 8/2016 | Womack |
| 2016/0342168 A1 | 11/2016 | Chamberlain et al. |
| 2017/0123175 A1 | 5/2017 | Van Baelen |
| 2018/0157000 A1 | 6/2018 | Miller |
| 2018/0159319 A1 | 6/2018 | Miller |
| 2018/0213091 A1 | 7/2018 | Kostakis |
| 2018/0231731 A1 | 8/2018 | Bakatsias |
| 2018/0254629 A1* | 9/2018 | Gattis .................. H01C 7/126 |
| 2019/0258280 A1 | 8/2019 | Chamberlain |

FOREIGN PATENT DOCUMENTS

| | | |
|---|---|---|
| DE | 102012008923 B4 | 9/2014 |
| DE | 102011111288 B4 | 3/2018 |
| DE | 102011111399 B4 | 5/2018 |
| EP | 0 095 539 A1 | 12/1983 |
| EP | 0660287 A1 | 6/1995 |
| EP | 0 942 303 A1 | 9/1999 |
| EP | 1 855 365 A1 | 11/2007 |
| EP | 2005854158 | 11/2007 |
| EP | 2 469 661 A1 | 6/2012 |
| EP | 2536035 A1 | 12/2012 |
| GB | 0637657 A | 5/1950 |
| GB | 2421641 A | 6/2006 |
| GB | 2452780 A | 3/2009 |
| JP | 2005 317472 A | 11/2005 |
| KR | 10-2010-0048227 A | 5/2010 |
| KR | 10-2010-0069332 A | 6/2010 |
| WO | 2006/076120 A1 | 7/2006 |
| WO | 2008/059212 A1 | 5/2008 |
| WO | 2010/024847 A2 | 3/2010 |
| WO | 2012/038104 A1 | 3/2012 |
| WO | 2012/108929 A1 | 8/2012 |
| WO | 2012/108930 A1 | 8/2012 |
| WO | 2013/055591 A2 | 4/2013 |
| WO | 2013/165657 A1 | 11/2013 |
| WO | 2014/009255 A1 | 1/2014 |
| WO | 2014/118227 A1 | 8/2014 |
| WO | 2014/134154 A1 | 9/2014 |
| WO | 2018/136812 A1 | 7/2018 |

OTHER PUBLICATIONS

CPRI Link Mobile Field Testing; AES (Advanced Embedded Solutions), aes-eu.com; Jun. 14, 2014; retrieved from the Internet Jun. 8, 2017 at <http://aes-eu.com/mobile-field-testing.php>; 4 pages.

FIS, the Solutionists, "High Density C-ran CPRI Interface Panel" Product Catalog, Rev. A; May 2015; Oriskany, New York; 2 pages. [Third Party Submission].

FIS, the Solutionists, CPRI Interface Panel Drawer with Integrated Cable Management; Sep. 27, 2015; ubeity.squarespace.com; Rev. A 3-2; 2 pages.

GE Product Data Sheet, CP2000DC54-PE Compact Power Line DC/DC Converter, Aug. 20, 2013, www.ge.com/powerelectronics; 15 pages.

Keithley Product Sheet, Single-Channel Programmable DC Power Supplies, Series 2200, undated; www.keithly.com; 4 pages.

Müller, Ulrich, Deploying and Managing New Cell Sites with FRR; Apr. 4, 2015; Telcom Infra Event; <http://telecominfraonline.nl/deploying-managing-new-cell-site/>; 21 pages.

Williams, et al. "2-Wire Virtual Remote Sensing for Voltage Regulators—Clairvoyance Marries Remote Sensing" Linear Technology Brochure, Application Note 126, Oct. 2010; www.linear.com; pp. AN126-1-AN126-22.

International Preliminary Report on Patentability and Written Opinion of the International Searching Authority for PCT/US2011/064704; dated Aug. 22, 2013; 8 pages.

International Preliminary Report on Patentability and Written Opinion of the International Searching Authority for PCT/US2011/064717 dated Aug. 22, 2013; 8 pages.

International Search Report and Written Opinion for PCT/US2011/064704; dated May 16, 2012; 12 pages.

International Search Report and Written Opinion for PCT/US2011/064717 dated May 16, 2012; 13 pages.

International Search Report and Written Opinion for PCT/US2015/013740 dated Apr. 28, 2015; 17 pages.

International Search Report and Written Opinion for PCT/US2016/022575 dated Aug. 17, 2016; 14 pages.

International Search Report and Written Opinion for PCT/US2018/014553 dated Apr. 6, 2018; 11 pages.

* cited by examiner

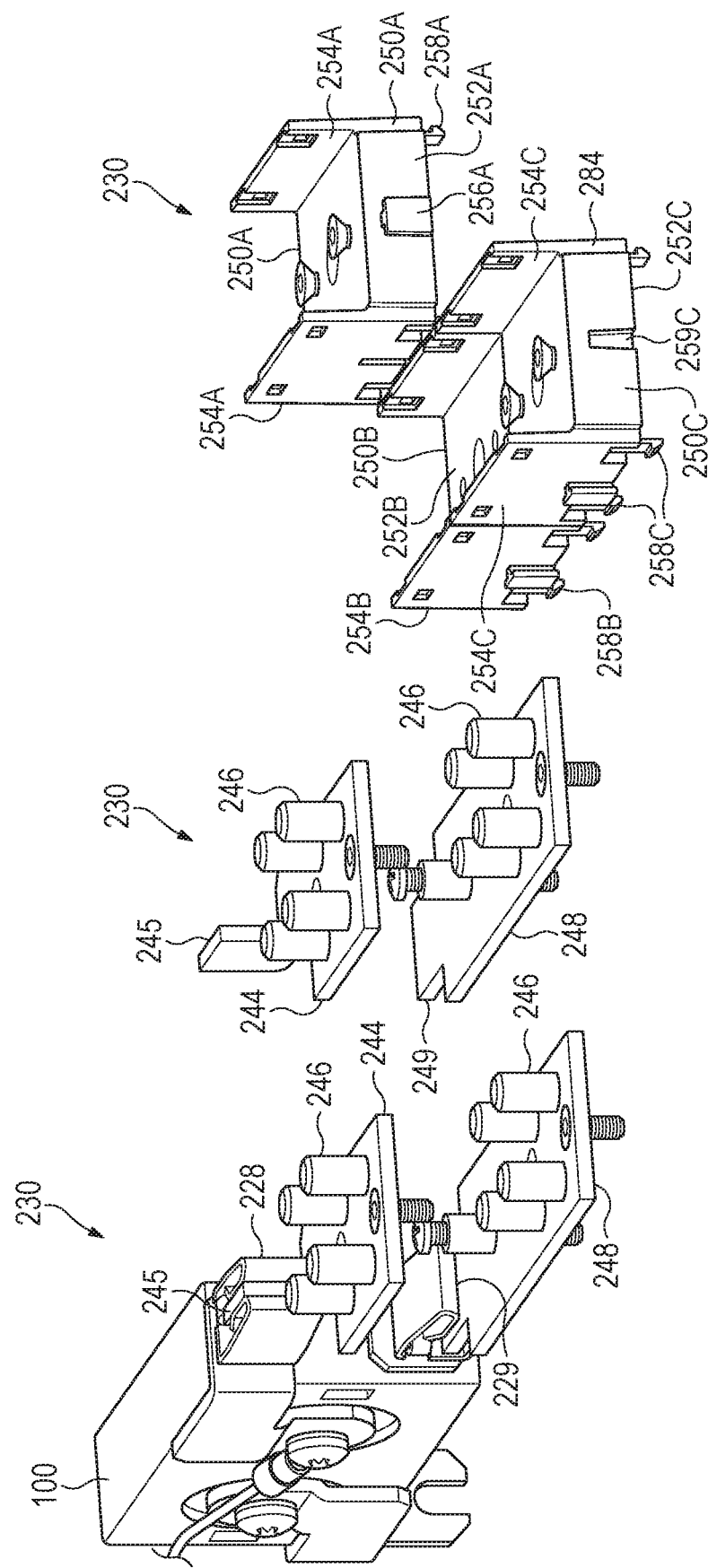

INTEGRATED OVERVOLTAGE PROTECTION AND MONITORING SYSTEM

The following applications are incorporated by reference in their entireties. U.S. patent application Ser. No. 14/615,803, filed Feb. 6, 2015, entitled: OVERVOLTAGE PROTECTION SYSTEM FOR WIRELESS COMMUNICATION SYSTEMS and U.S. Pat. No. 8,730,639, issued May 20, 2014.

BACKGROUND

Until recently, most wireless communications sites included radio systems that were located on the ground level in a building, cabinet or other shelter. The DC power supply, baseband controller, amplifiers and radios were historically located in one location within the shelter. From this location, coaxial cable was run from the radios to antennas that were supported on a tower outside the building. Equipment installed in this manner is susceptible to lightning strike damage either due to lightning strikes directly hitting the antennas or from induced energy from the tower structure. Coaxial lightning protectors are commonly used to protect the antennas on the tower and radios on the ground. The DC power plant is somewhat isolated from direct lightning events, due to the radios, other dc-powered equipment and grounding obstructing the path of the lightning strike to earth.

Latest generation wireless communications systems, referred to as distributed antenna systems (DAS), distributed DC radio systems, remote radio heads (RRH), 4G and long term evolution (LTE) cellular communication systems, now commonly locate the radios next to the antennas on the tower outside of the communications shelter. In these next-generation facilities, the baseband system module that controls the radio traffic is still located at the ground level shelter, but the radios are separated from the controllers up to several hundred feet and controlled by fiber optic links. The radios are powered directly by DC feeds from the DC power plant that extend up the tower and to the radios. In some cases, the DC cables and fiber optic cables are run separately up the tower and in other cases they are all bundled together in one large hybrid cable.

The radios located outside of the communications shelter on top of the tower are much more susceptible to damage from lighting strikes and other electrical power surge events. Individual power lines are run to each individual radio also increasing the amount of power cabling exposed to power surge events. Thus, the DC power plant and telecommunication equipment at communication stations with distributed power have more risk of being damaged due to direct lighting strikes and power surges.

OVERVIEW

A remote suppression unit retains a first set of surge suppression modules. A base suppression unit retains a second set of surge suppression modules. An over voltage protection (OVP) board in the remote suppression unit includes power strips that couple the first set of surge suppression modules to remote ends of DC power cables and a configurable terminal assembly in the base suppression unit couples the second set of suppression modules to local ends of the DC power cables.

The surge suppression modules in combination with the OVP board and terminal assembly provide more suppression protection in both the remote and base suppression units. A remote voltage monitor circuit in the remote suppression unit measures voltages on remote ends of the DC power cables and transmits the voltages to a monitor circuit in the base suppression unit.

The suppression system provides more effective protection for communication stations with distributed radio and power systems. The suppression system provides surge protection both locally near the radio station building where the power plant and telecommunication equipment are located and remotely next to the radios and antennas located outside of the building on the communication tower.

The remote external suppression unit provides waterproof easy to install enclosures for both suppression devices and fiber optic connectors. The external suppression units may have low wind load, reduced weight, and can be placed on a wide variety of different radio towers and building structures with tight space restrictions. The enclosures may be water resistant while also simplifying insertion of power cables and fiber optic cables within the interior of the enclosure.

The new suppression modules provide more integrated suppression assemblies both in the external suppression units and in a rack mountable suppression unit. The monitoring circuits in the remote and base suppression units can monitors DC voltage levels and alarm conditions, such as suppression device failures, intrusion, and/or water exposure. Displays are provided on the suppression units that identify the voltage levels and alarm conditions.

BRIEF DESCRIPTION OF THE DRAWINGS

FIG. 11 shows different portions of a configurable terminal assembly located in the base suppression unit.

DETAILED DESCRIPTION

Several preferred examples will now be described with reference to the accompanying drawings. Various other examples are also possible and practical. The suppression system may be exemplified in many different forms and should not be construed as being limited to the examples set forth herein.

Figure 1:
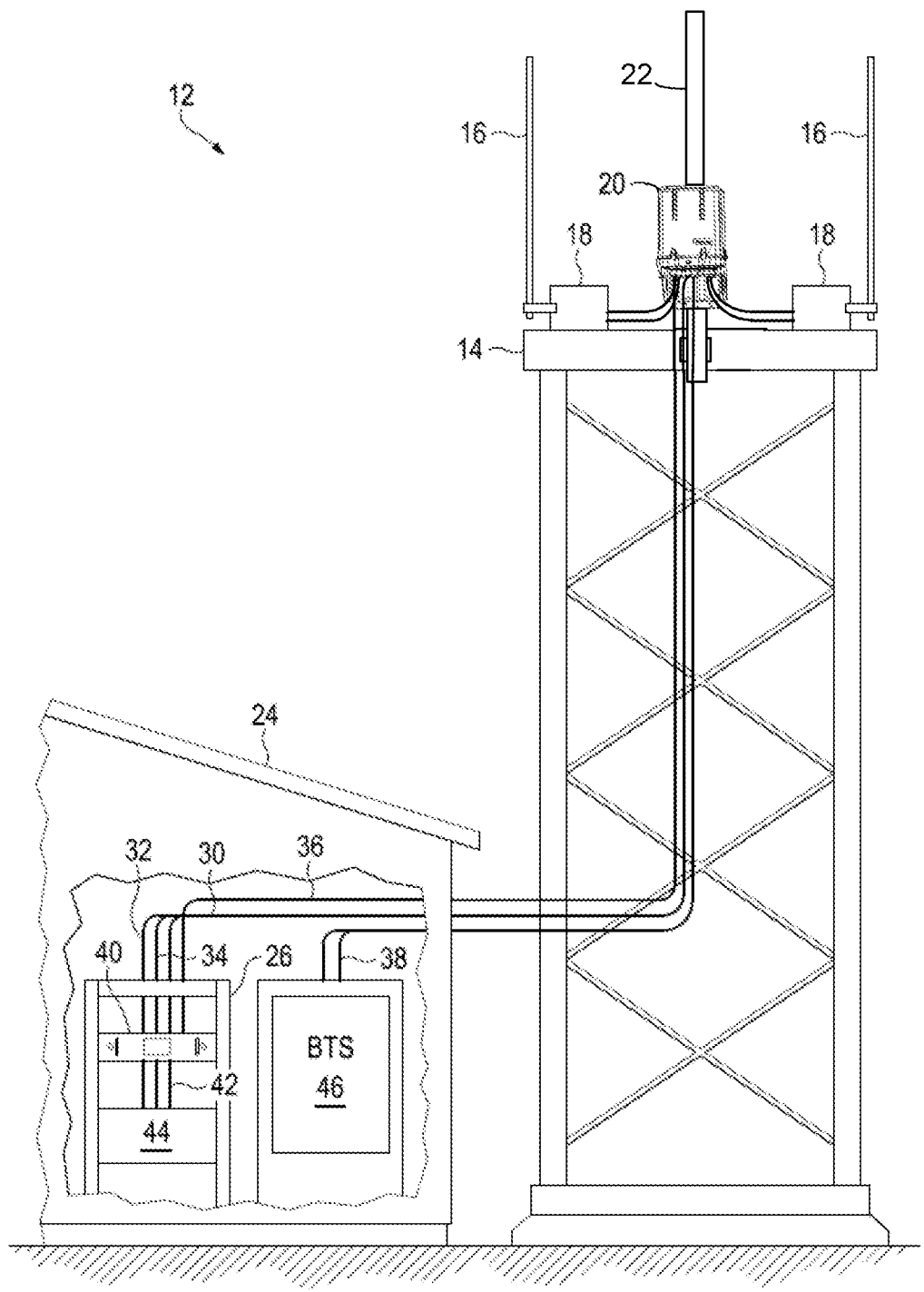
FIG. 1 shows a suppression system used with a remote radio head-based wireless communication system.

FIG. 1 illustrates one example of a suppression system 12 that provides suppression for a distributed wireless communication station. A building 24 contains computing equipment for a base transceiver communication station (BTS) 46. Communication station 46 is connected through fiber optic cables 38 to different radios 18 located on the top of a tower 14. A Direct Current (DC) power plant 44 is connected through a DC power bus 42 and DC power cables 30 to the different radios 18 on tower 14. In one example, DC power cables 30 include sets of −48 DC volt power cables 32, return power cables 34, and associated ground cables that extend out of building 24 and run up tower 14 to different associated radios 18. Radios 18 are connected to associated antennas 16.

A remote suppression unit 20 is attached to a support 22 on top of tower 14 and is connected to the remote ends of power cables 30 proximate to radios 18 and antennas 16. In one example, remote suppression unit 20 is located within 2 meters of radios 18. A local base suppression unit 40 is located inside of building 24 and is connected to the opposite local ends of power cables 30 relatively close to DC power plant 44 and communication station 46. In one embodiment, base suppression unit 40 is located in a rack 26 that also contains DC power plant 44. In another example, base suppression unit 40 is located in another rack or some other location next to power plant 44.

A monitor cable 36 may connect monitoring circuitry in base suppression unit 40 to monitoring circuitry in remote suppression unit 20. Monitoring circuitry may use monitor cable 36 to identify different alarm and voltage conditions in remote suppression unit 20. For example, the monitoring circuitry may detect a failure of a suppression device within remote suppression unit 20, detect intrusion into remote suppression unit 20, detect water infiltration within remote suppression unit 20, and/or detect remote voltage levels within remote suppression unit 20.

In one example, radios 18 may be located outside of building 24, but relatively close to base suppression unit 40. For example, radios 18 may be located on the top of a building that also houses DC power plant 44 and communication station 46. In this example, base suppression unit 40 still may be located in rack 26. However, remote suppression units 20 may or may not be used for connecting to the opposite ends of power cables 30 outside of building 24.

In another configuration, radios 18 and associated antennas 16 are located at different corners on the roof of a building. Individual suppression boxes can be connected to individual DC power cables 30 close to different radios 18 on the roof of the building. Each of the boxes may contain suppression devices for one or a few power cables and associated radios. In this configuration base suppression unit 40 still may be used but suppression boxes located on the roof may be configured differently than the suppression units 20 shown below.

In another example, individual suppression boxes are connected to the individual DC power cables 30 and located next to the associated radios 18 on the roof of the building. A separate fiber/power connector on the top of the building provides a junction between the DC power cables 30 and fiber optic cables 38 extending inside the building and jumper cables that connect to the radios 18.

In another example, different radios 18 are located relatively close to each other, and remote suppression units 20 are used both for containing suppression devices and as a junction box for fiber optic cable jumpers that are distributed out to radios 18. In another example, remote suppression units 20 may only operate as junction boxes for DC power cables 30 and/or fiber optic cables 38. The same base suppression unit 40 may be located in building 24 and may have a same or different suppression configuration than the configuration shown below.

Figure 2:
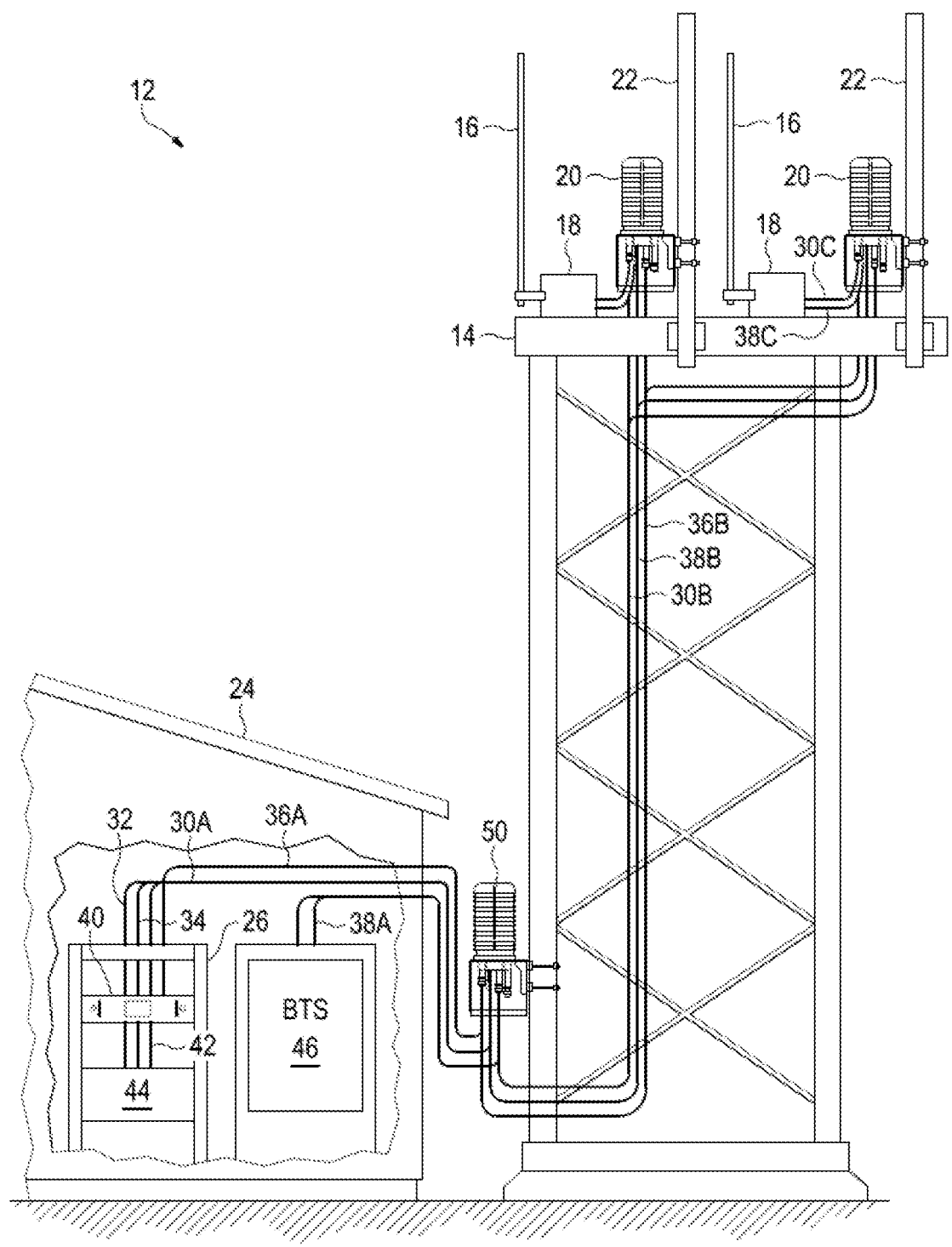
FIG. 2 shows an alternative configuration of the suppression system in FIG. 1.

FIG. 2 depicts a second example suppression system 12. In this example, multiple remote suppression units 20 are located on tower 14. Each remote suppression unit 20 may provide power jumper cables 30C and fiber optic jumper cables 38C to an associated set of radios 18 and provide surge suppression for two different radios 18. However, any number of remote suppression units 20 may include any number of suppression devices for connecting to any number of radios 18. In one example, each remote suppression unit 20 is associated with a sector.

Remote suppression units 20 may connect to DC power plant 44 via a base suppression unit 50. For example, a first set of DC power cables 30A, fiber optic cables 38A, and monitoring cables 36A may be connected between base suppression unit 40 and base suppression unit 50. A second set of DC power cables 30B, fiber optic cables 38B, and sensor cables 36B may be connected between base suppression unit 50 and different remote suppression units 20.

In another example, base suppression unit 50 may contain suppression devices. In this example, base suppression unit 40 might not include suppression devices and DC power cables 30 may connect from DC power plant 44 directly to base suppression unit 50. In another example, base suppression unit 50 may include connectors but no suppression devices. Base suppression unit 50 may operate as a terminal box for connecting DC power cables 30A to DC power cables 30B, connecting fiber optic cables 38A to fiber optic cables 38B, and connecting monitoring cables 36A to monitoring cables 36B. In any of these examples, base suppression unit 50 may include display circuitry for displaying alarm and/or voltage conditions detected remotely in remote suppression units 20 or detected locally in base suppression unit 50.

Remote Suppression Unit

Figure 3:
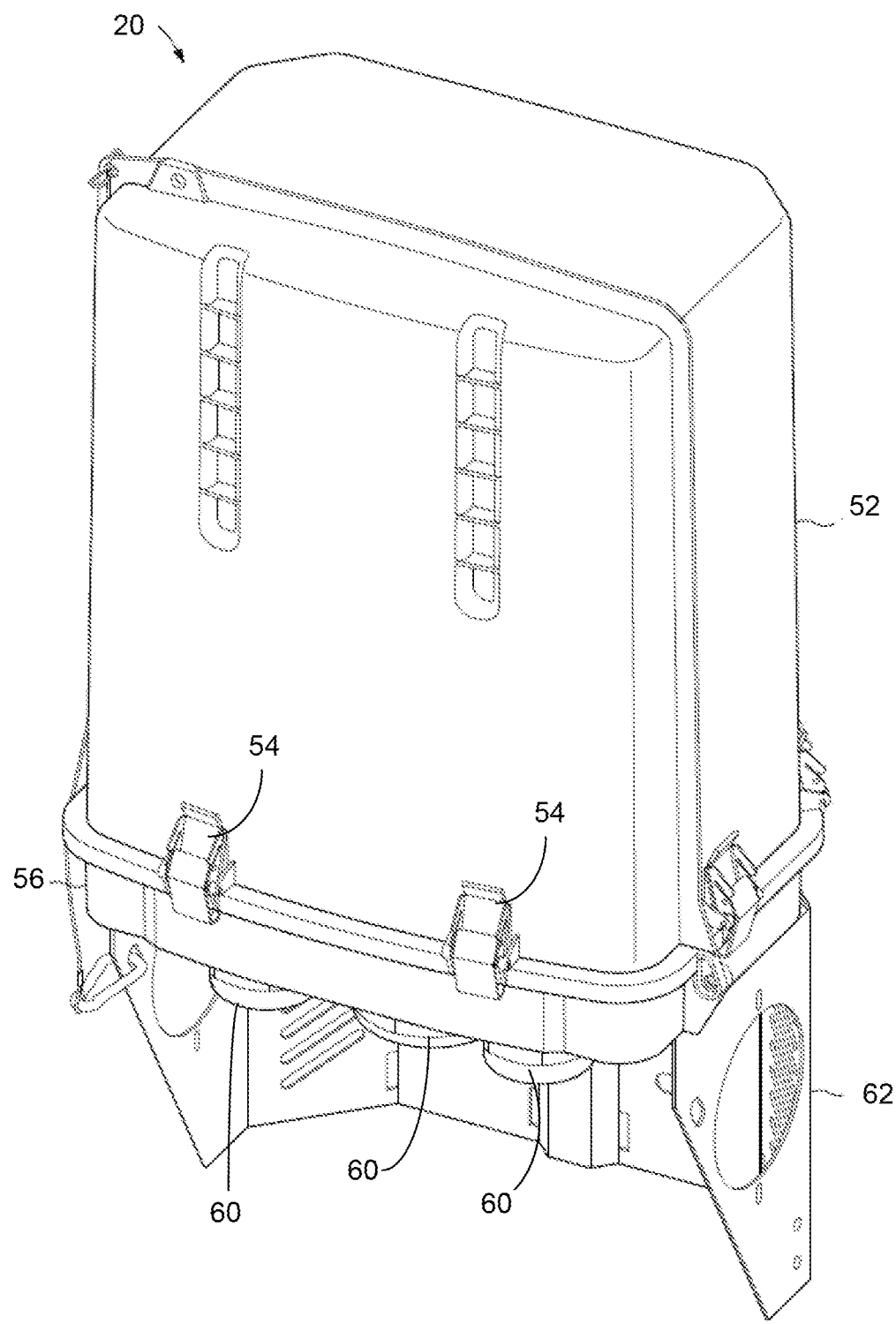
FIG. 3 shows a remote suppression unit.

FIG. 3 shows in more detail one of remote suppression units 20. A plastic lid 52 sits over a base 56. Latches 54 hold lid 52 in compression onto base 56. In one example, entire remote suppression unit 20 is around 13 inches or 340 millimeters (mm) tall and is around 11 inches or 281 mm wide. Of course, remote suppression unit 20 can be other dimensions based on different suppression requirements.

Ports 60 extend vertically up through base 56 and receive the DC power cables, fiber optic cables, and/or monitoring cables described above. In one example, ports 60 may comprise round tubes formed from plastic, such as a semi-flexible polyvinyl chloride (PVC) material. Ports 60 may include water tight glands configured per cable vendor specifications for preventing water to access the interior of remote suppression unit 20.

A mounting bracket 62 attaches to the support pole 22 shown above in FIGS. 1 and 2. Alternatively, mounting bracket 62 may attach to a wall or to a pole that extends up from the top of a roof. Mounting bracket 62 includes a mounting platform that attaches to the bottom of base 56 and holds remote suppression unit 20 in a vertical elevated position.

Figure 4:
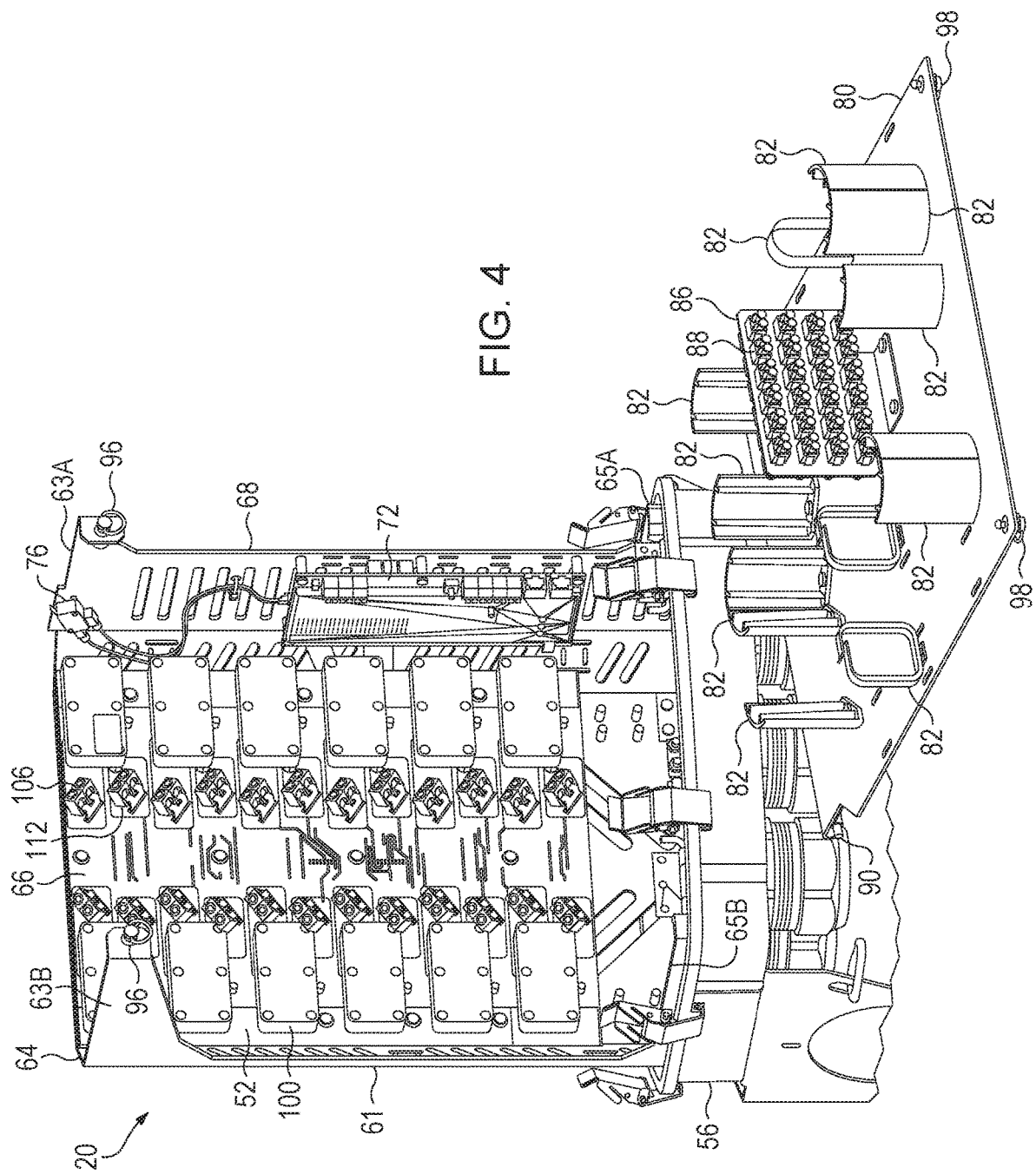
FIG. 4 shows the remote suppression unit of FIG. 3 with a lid removed.
Figure 5:
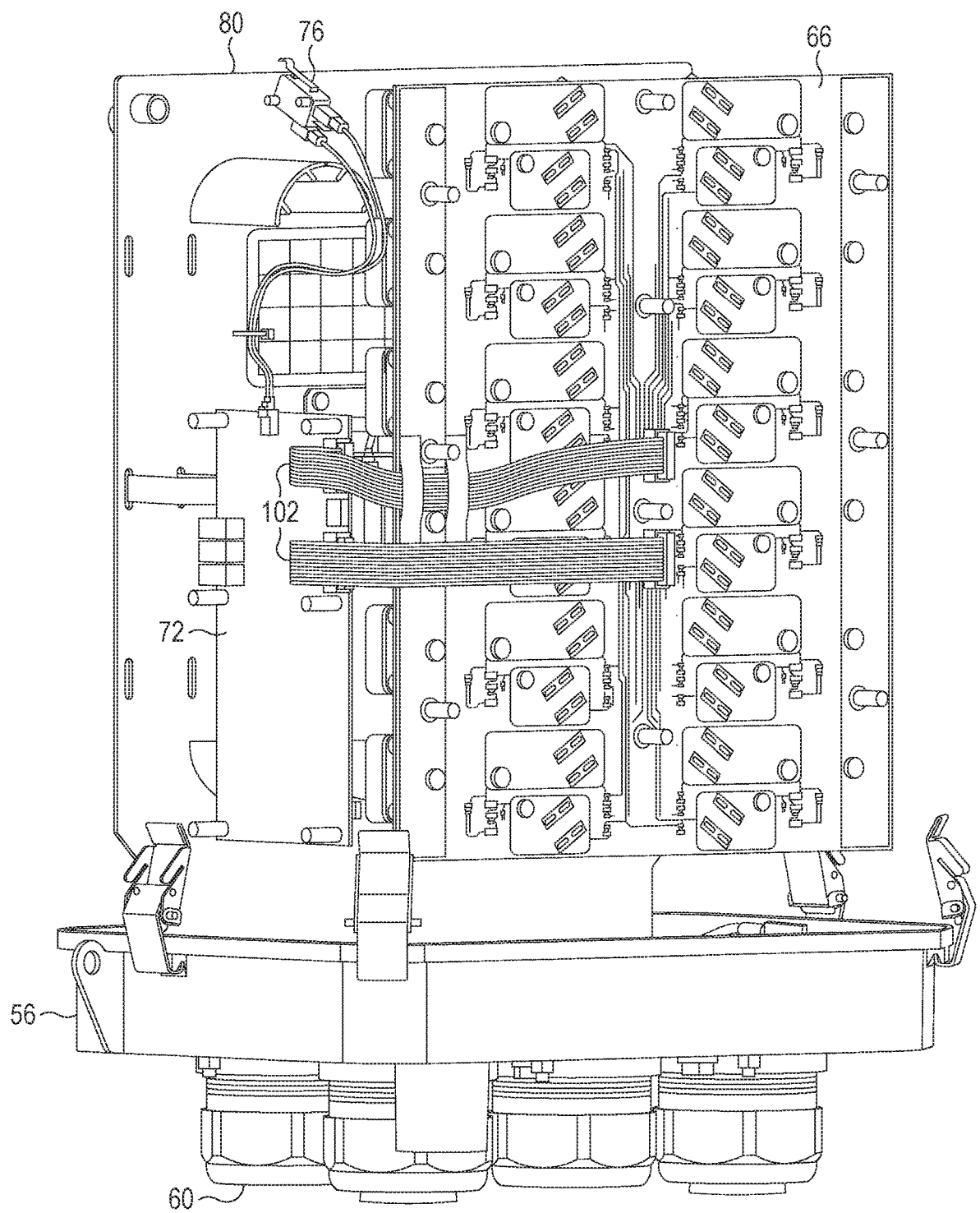
FIG. 5 shows a back side of the remote suppression unit of FIG. 3.

FIG. 4 is a front perspective view of remote suppression unit 20 with lid 52 removed and FIG. 5 shows a back view of remote suppression unit 20 with lid 52 removed. Referring to FIGS. 4 and 5, a shell 61 attaches on top of base 56. Shell 61 includes a wall 64 that extends vertically upward and supports an over-voltage protection (OVP) printed circuit board 66. A side wall 68 extends forward from a first side of wall 64 and retains a monitor printed circuit board 72. A lower support arm 65A and an upper support arm 63A both extend forward from side wall 68 toward a front end of base 56. A lower support arm 65B and an upper support arm 63B extend forward from a second side of wall 64 toward a front end of base 56.

Suppression modules 100 are attached to OVP board 66 and provide suppression protection for radios located proximate to remote suppression unit 20. Suppression modules 100 are described in more detail below in FIGS. 9 and 10 and are also described in U.S. Pat. No. 7,433,169, issued on Oct. 7, 2008, entitled: OVERVOLTAGE PROTECTION DEVICES INCLUDING WAFER OF VARISTOR MATERIAL, and/or U.S. Pat. No. 8,743,525 B2, issued on Mar. 3, 2014, entitled: OVERVOLTAGE PROTECTION DEVICES INCLUDING WAFER OF VARISTOR MATERIAL which are incorporated by reference in their entireties. Suppression modules 100 employing alternative technologies, that what is described in this patent, could also be used provided they come at a similar shape format.

A fold-out panel 80 is rotatably attached to the front ends of lower arms 65A and 65B. For example, pins 90 may extend outward from opposite bottom ends of panel 80 and insert into holes located in the front ends of lower support arms 65A and 65B. In the folded-out position shown in FIG. 4, a back side of panel 80 extends upward and contains a fiber optic cable tray 86 that retains fiber optic adapters 88.

An installer may remove panel 80 from lower arms 65 when installing power cables onto OPV board 66. For example, the installer may extract pins 90 from the holes in lower support arms 65. Panel 80 then hangs below base 56 by a lanyard that is attached to a carabiner that is attached to base 56. Dangling panel 80 provides more accessibility to the front end of suppression unit 20.

After the power cables and monitoring cables are installed inside of remote suppression unit 20, the installer may reattach panel 80 to the front ends of lower support arms 65. The installer inserts the fiber optic cables from the communication station up through one of ports 60 and plugs the fiber optic cables into the bottom ends of adapters 88. The installer then plugs first ends of fiber optic jumper cables into top ends of adapters 88 and connects second ends of the fiber optic jumper cables to radios 18. Excess fiber optic cable is wrapped around supports 82.

The installer rotates panel 80 upward and inserts screws 98 on a top end of panel 80 into threaded holes 96 located on the front ends of upper support arms 63. Panel 80 is removed and/or folded-out to provide easier installation of power, fiber optic, and monitoring cables within suppression unit 20. Folding panel 80 up against upper support arms 63 then reduces the overall footprint and wind load of suppression unit 20.

An intrusion sensor 76, such as a proximity switch, detects access into suppression unit 20. Intrusion sensor 76 rotates upward when lid 52 in FIG. 3 is lifted off of base 56 and rotates downward when lid 52 is attached onto base 56. Intrusion sensor 76 is electrically connected to monitor board 72 and generates an alarm signal when lid 52 is removed.

Monitor board 72 includes a central processing unit (CPU) that generates messages indicating failures of suppression modules 100, voltage levels on the power cables, wiring anomalies, or any other power disruption. As mentioned above, the CPU may send intrusion or water ingress messages based on activation of intrusion switch 76 or activation of a water detection switch (not shown). Monitor board 72 uses a RS485 communication link with 2 twisted pair (+ground) wires to communicate voltage, up-converter system, and alarm data to base suppression unit 40 in FIG. 1. Firmware operating in the CPU on monitor board 72 can be updated through the RS485 connection.

DC power cables 32 and 34 (FIG. 1) are routed from the base of tower 14 to the top of tower 14. Terminal blocks 106 and 112 are mounted to OPV board 66 and are connected to cables 32 and 34, respectively. Wires 102 connect DC voltages on suppression modules 100 to monitor board 72. The voltages are tied together using diodes to create a common bus to voltmeter (VM) and alarm (ALM) circuitry on monitor board 72. The voltages are also connected to precision resistor divider networks and transient-voltage-suppression (TVS) protection in suppression modules 100 and are measured with an analog to digital converter (ADC).

Figure 6:
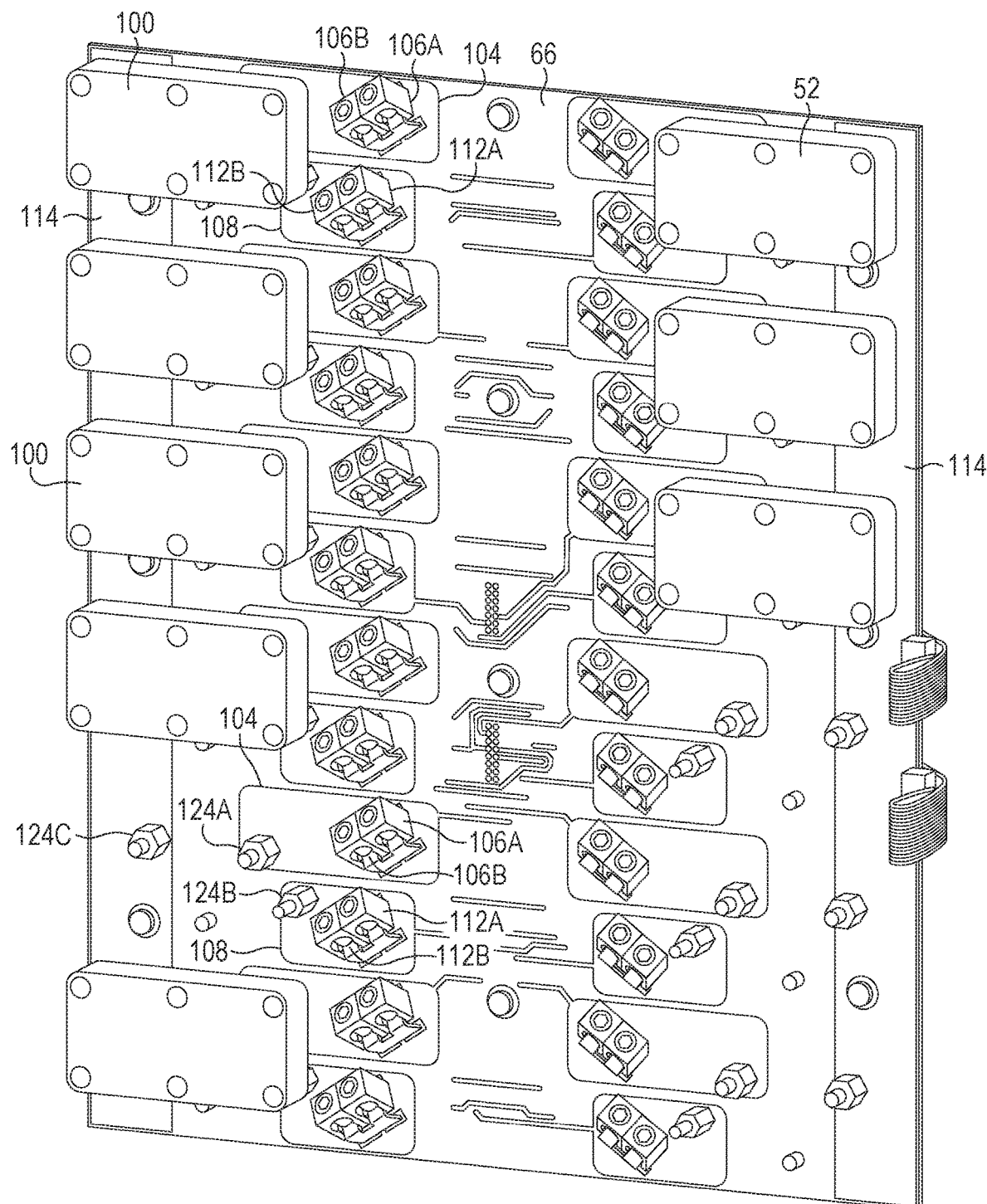
FIG. 6 shows an isolated view of an over voltage protection (OVP) board located in the remote suppression unit.

FIG. 6 depicts an example isolated front view of OPV board 66 in remote suppression unit 20. A first terminal 106A connects to a first −48 VDC power cable and a second terminal 106B connects to a −48 VDC jumper cable that connects to one of the radios 18 in FIGS. 1 and 2. A terminal 112A connects to a return power cable and a terminal 112B connects to a return power jumper cable that connects to one of radios 18. Terminals 106A and 106B are connected to a −48 VDC power strip 104 formed on OVP board 66. Terminals 112A and 112B are connected to a return power strip 108 formed on OVP board 66. Ground strips 114 extend along opposite lateral sides of OVP board 66.

A first set of bolts 124A extend through the back side of OVP board 66 and couple bottom ends of suppression units 120A to −48 VDC power strips 104 and terminals 106A and 106B. A second set of bolts 124B extend through the back side of OVP board 66 and couple container 122 and attached suppression units 120A and 120B to return power strip 108 and terminals 112A and 112B. A third set of bolts 124C extend through the back side of OVP board 66 and couple bottom ends of suppression units 120B to ground strips 114.

Power strips 104 and 108 have substantially rectangular shapes and are aligned in first and second columns in alternating order. The substantially flat low profile and relatively small rectangular footprint of suppression modules 100 allow two columns of suppression modules 100 to be located on OPV board 66.

Base Suppression Unit

Figure 7:
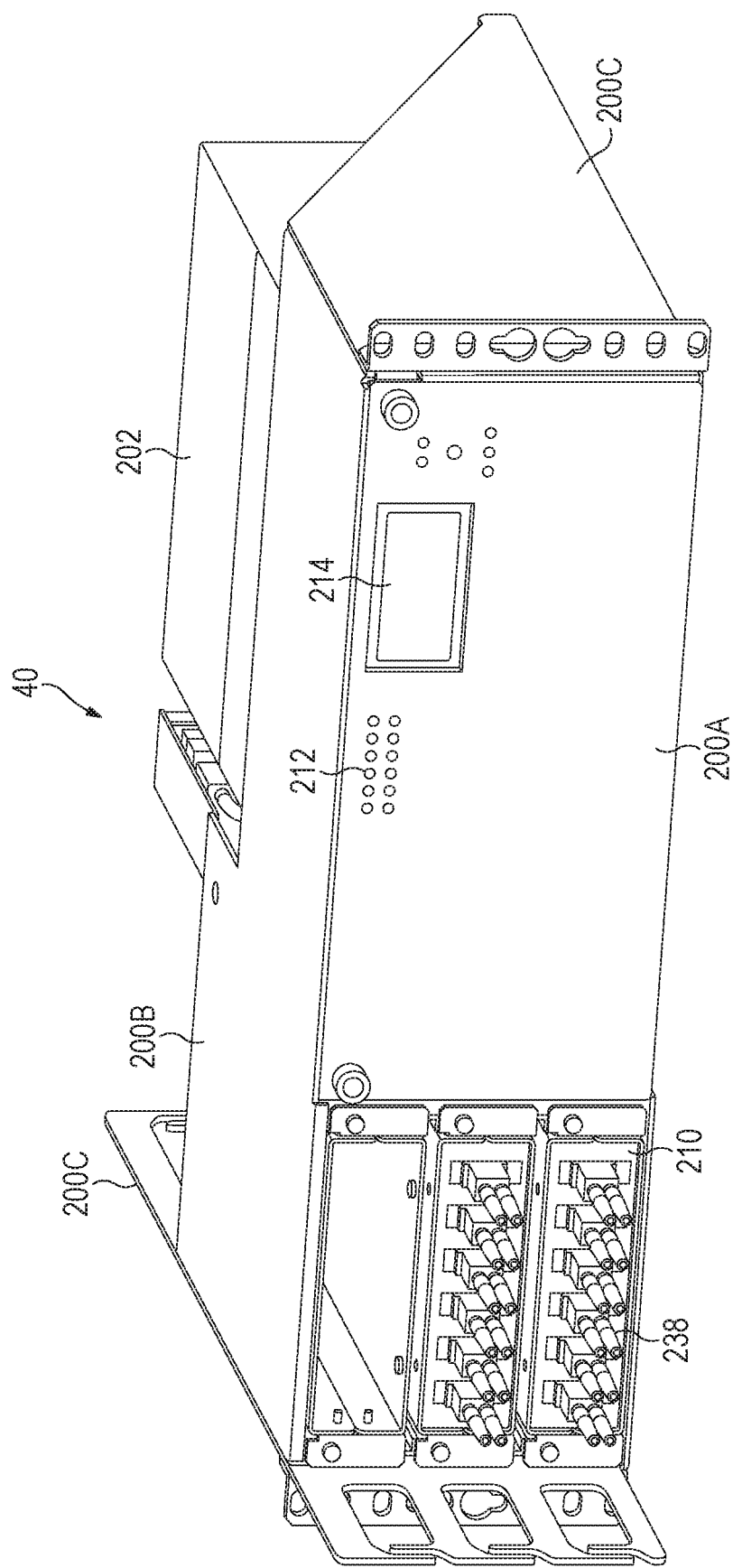
FIG. 7 shows a front perspective view of a base suppression unit.

FIG. 7 shows a front perspective view of base suppression unit 40 previously shown in FIGS. 1 and 2. Base suppression unit 40 includes an enclosure 200 that inserts and attaches to rack 26 that also may support DC power plant 44 (FIG. 1). Enclosure 200 includes a front face 200A, top and bottom walls 200B and side walls 200C. A right portion of enclosure 200 contains an overvoltage protection (OVP) assembly 202 that includes multiple suppression modules 100. A left portion of enclosure 200 contains multiple fiber optical modules 210.

Fiber optical modules 210 are described in U.S. patent application Ser. No. 14/931,699; entitled: MODULAR FIBER OPTIC CABLE SPLITTER, filed Nov. 3, 2015; and U.S. patent application, Ser. No. 15/836,021 entitled: FIBER OPTIC CABLE MANAGEMENT SYSTEM, filed Dec. 8, 2017; which are both incorporated by reference in their entireties. Accordingly, fiber optical modules 210 are not described in further detail.

A set of light emitting diodes (LEDs) 212 extend out of front face 200A and indicate the status of suppression modules in OVP assembly 202. A display 214 also extends out from front frame 200A of enclosure 200 and identifies the voltage levels of DC power cables 30 at the top of tower 14. As explained above, monitor board 72 in remote suppression unit 20 may transmit measured voltages and other alarm conditions at the top of tower 14 to base suppression unit 40. Base suppression unit 40 displays the measured voltages and alarms on display 214.

Base suppression unit 40 has may have a conventional Rack Unit (RU) form factor that in one embodiment is a 2RU enclosure that can fit into a 19 inch or 23 inch rack configuration. This allows base suppression unit 40 to be mounted in the same rack 26 that holds the electronic circuitry for DC power plant 44 and/or holds the telecommunication circuitry for the BTS 46 shown in FIGS. 1 and 2. This allows base suppression unit 40 to be connected closer to DC power plant 44 and communication station 46. Base suppression unit 40 can be mounted onto any other rack or any other structure that may be housed in the building 24 shown in FIGS. 1 and 2, uses minimal space, and does not require a special mounting structure or rack.

Figure 8:
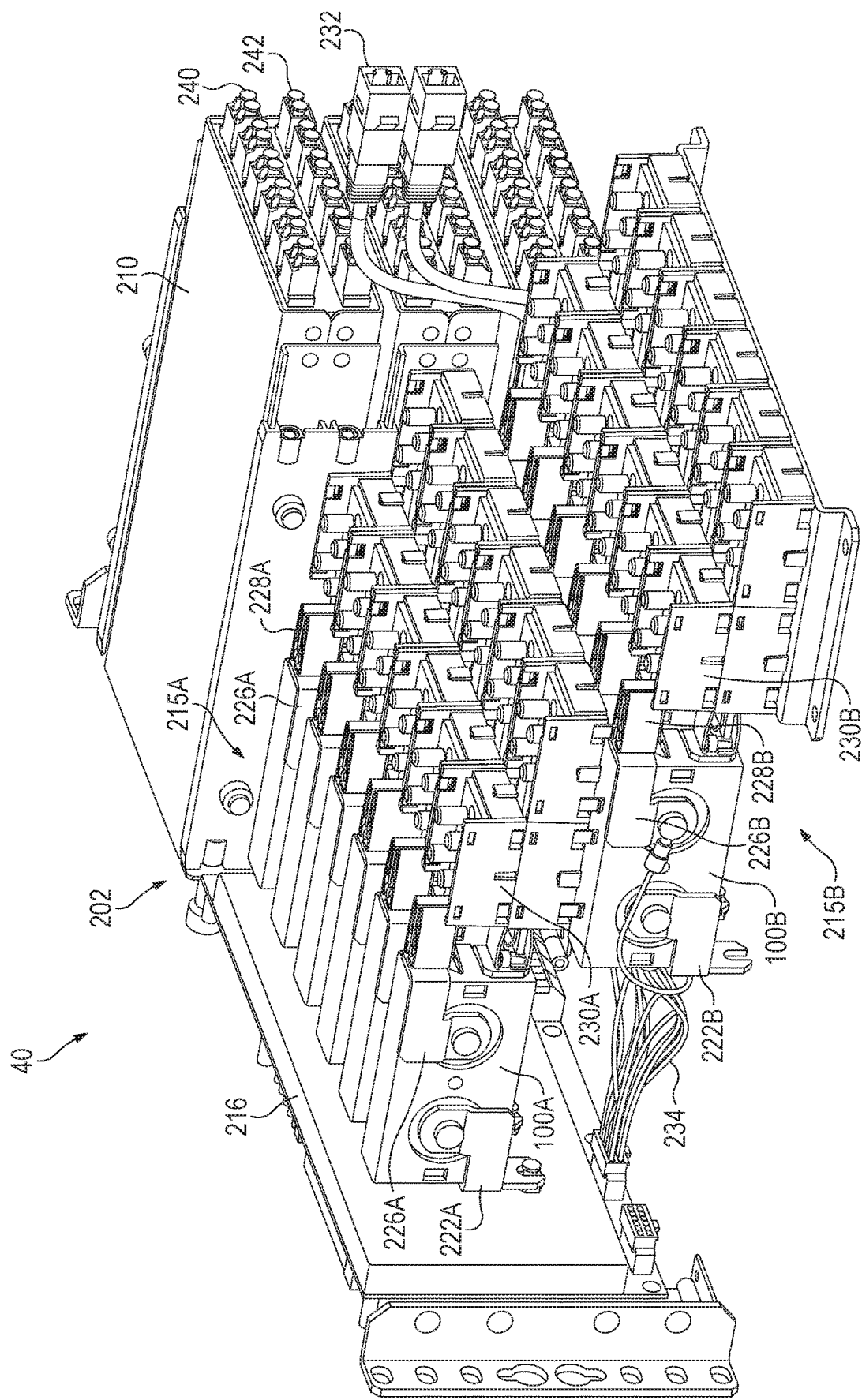
FIG. 8 shows a rear perspective view of the base suppression unit of FIG. 7 with part of the enclosure removed.

FIG. 8 depicts a rear view of base suppression unit 40 with enclosure 200 removed. Multiple suppression modules 100 are aligned in two rows in the right section of base suppression unit 40. A first row 215A of six suppression modules 100A are attached at font ends by bus bars 222A to a mounting frame 260 (see FIG. 12) located in enclosure 200 behind monitor board 216. Monitor board 216 contains LEDs 212 and display 214 described above in FIG. 7. Back ends of suppression modules 100A are attached by bus bars 226A and clips 228A to a first row of terminal assemblies 230A.

A second row 215B of six suppression modules 100B are attached at front ends by bus bars 222B to a bracket (not shown) that extends vertically up from the bottom wall of enclosure 200. Back ends of suppression modules 100B are attached by bus bars 226B and clips 228B to a second rows of terminal assemblies 230B.

Cables 232 connect to local ends of RS485 monitor cables 36 that connect on second remote ends to monitor board 72 in remote suppression unit 20 as shown in FIG. 1. Monitor wires 234 are connected to each suppression module 100. Monitor wires 234 are connected to local ends of −48 V power cables 32 and local ends of return power cables 34. Monitor wires 234 connect to monitor board 216 and connect to LEDs 212 in FIG. 7 to identify the condition of suppression devices in suppression modules 100.

In one example, three fiber optical modules 210 are stacked on top of each other and may be mounted in trays that slide in and out of enclosure 200 as described in U.S. patent application Ser. Nos. 14/931,699 and 15/836,021. A first set of upper interconnection ports 240 are coupled to uplink and downlink fibers that attach to RRUs 18 on the top of tower 14. A second set of interconnection ports 242 are coupled to uplink and downlink fibers that attach to a base band unit (BBU) located in BTS 46 of FIG. 1. Fiber splitters in fiber optical modules 210 split the uplink and downlink optical fiber signals and connect the split optical fiber signals to a set of monitoring ports 238 that extend out of the front ends of fiber optical modules 210 (see FIG. 7).

Figure 10:
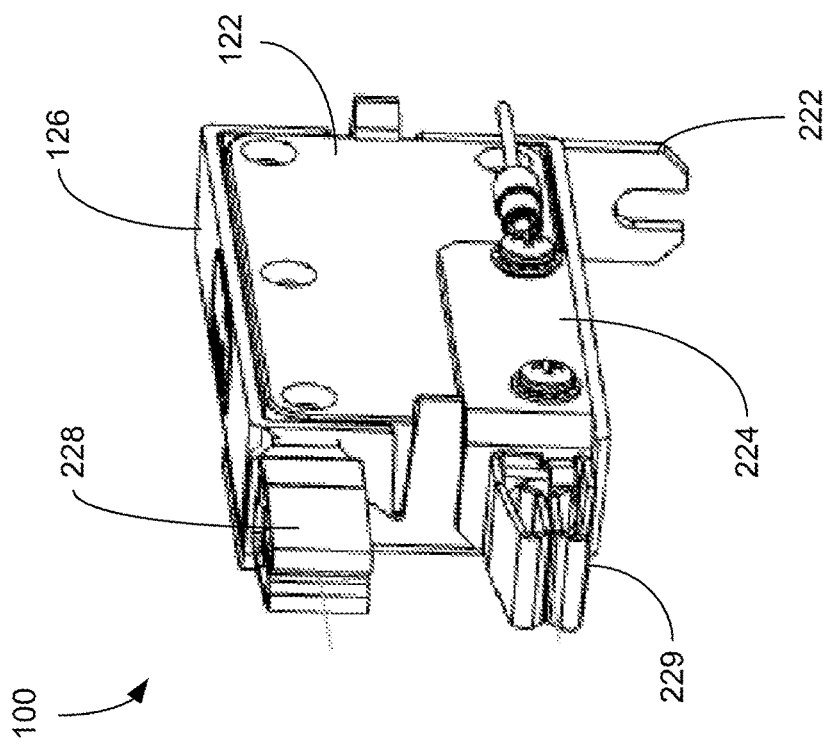
FIGS. 9 and 10 show perspective views of a surge suppression module used in the base suppression unit.
Figure 9:
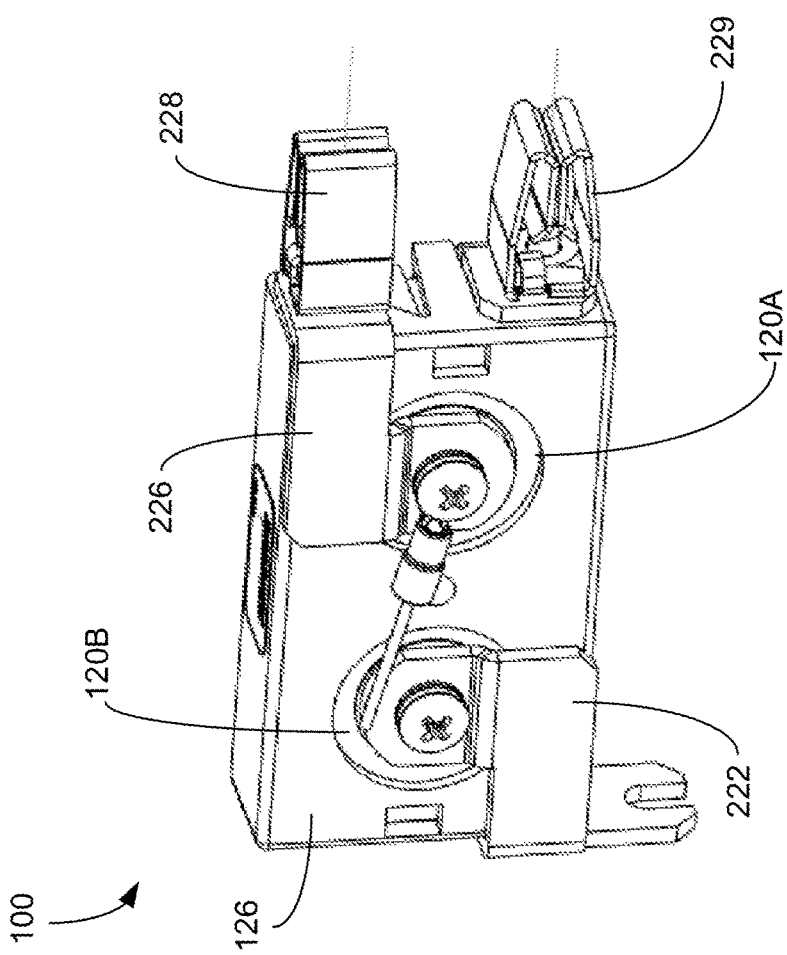

FIG. 9 is a perspective side view of suppression module 100 and FIG. 10 is a perspective opposite side view of suppression module 100. Suppression modules 100 may be the same as suppression modules 100 used above in remote suppression unit 20. However, additional bus bars 222, 224, and 226 are used to connect suppression modules 100 to terminal assemblies 230.

Container 122 contains suppression units 120A and 120B. A cover 126 snaps over the top, bottom, and right sides of container 122. A first end of −48v bus bar 226 screws into suppression unit 120A and extends over the side of cover 126. A second end of bus bar 226 is bent in a 90-degree angle relative to the first end and extends over the back end of cover 126. The second end of bus bar 226 attaches to connector 228.

A first end of a return bus bar 224 screws into container 122 which connects to suppression units 120A and 120B. A second end of bus bar 224 is bent in a 90-degree angle relative to the first end and also extends over the back end of cover 126. The second end of bus bar 224 attaches to connector 229. A first end of ground bus bar 222 screws into suppression unit 120B and extends over the side of cover 126 toward the front end of suppression module 100. A second end of bus bar 222 is bent in a 90-degree angle relative to the first end and extends over front end of cover 126. The second end of bus bar 222 attaches to a grounded support frame 260 (see FIG. 12).

FIG. 11 shows different isolated views of suppression module 100 and terminal assembly 230. Terminal assembly 230 include a first rectangular shaped upper terminal plate 244 that includes a front tab 245. Tab 245 is bent vertically upwards at a 90-degree angle relative to horizontal terminal plate 244 and inserts into clip 228. Four terminal posts 246 extend vertically up from the upper terminal plate 244. A first pair of terminal posts 246 attach to local ends of the −48V power cables 32. A second pair of terminal posts 246 attach to the −48V DC power bus 42 connected to DC power plant 44 (see FIG. 1).

Terminal assemblies 230 include a second rectangular shaped lower terminal plate 248 that includes a front tab 249. Tab 249 extends horizontally out in front of horizontal terminal plate 248 and inserts into connector clip 229. Four terminal posts 246 extend vertically up from the lower terminal plate 248. A first pair of terminal posts 246 attach to local ends of return power cables 34. A second pair of terminal posts 246 attach to return DC power bus 42 connected to DC power plant 44.

Terminal assemblies 230 also include retainers 250 for holding terminal plates 244 and 248. For example, a first upper retainer 250A may include two side wall members 254A that extend up from the sides of a base member 252A. Upper terminal plate 244 inserts in between side wall members 254A and screws down onto a top surface of base member 252A. Clips 258A extend down from the bottom of base member 252A and may clip into side walls 254B of lower retainer 250B. A clip 256A may insert into a slot 259 formed in a horizontally adjacent retainer 250.

Two lower retainers 250B and 250C may each include two side wall members 254B and 254C, respectively, that extend up from opposite sides of a base members 252B and 252C, respectively. Lower terminal plate 248 inserts in between side wall members 254B and 254C and screws down onto top surfaces of base members 252B and 252C.

Figure 12:
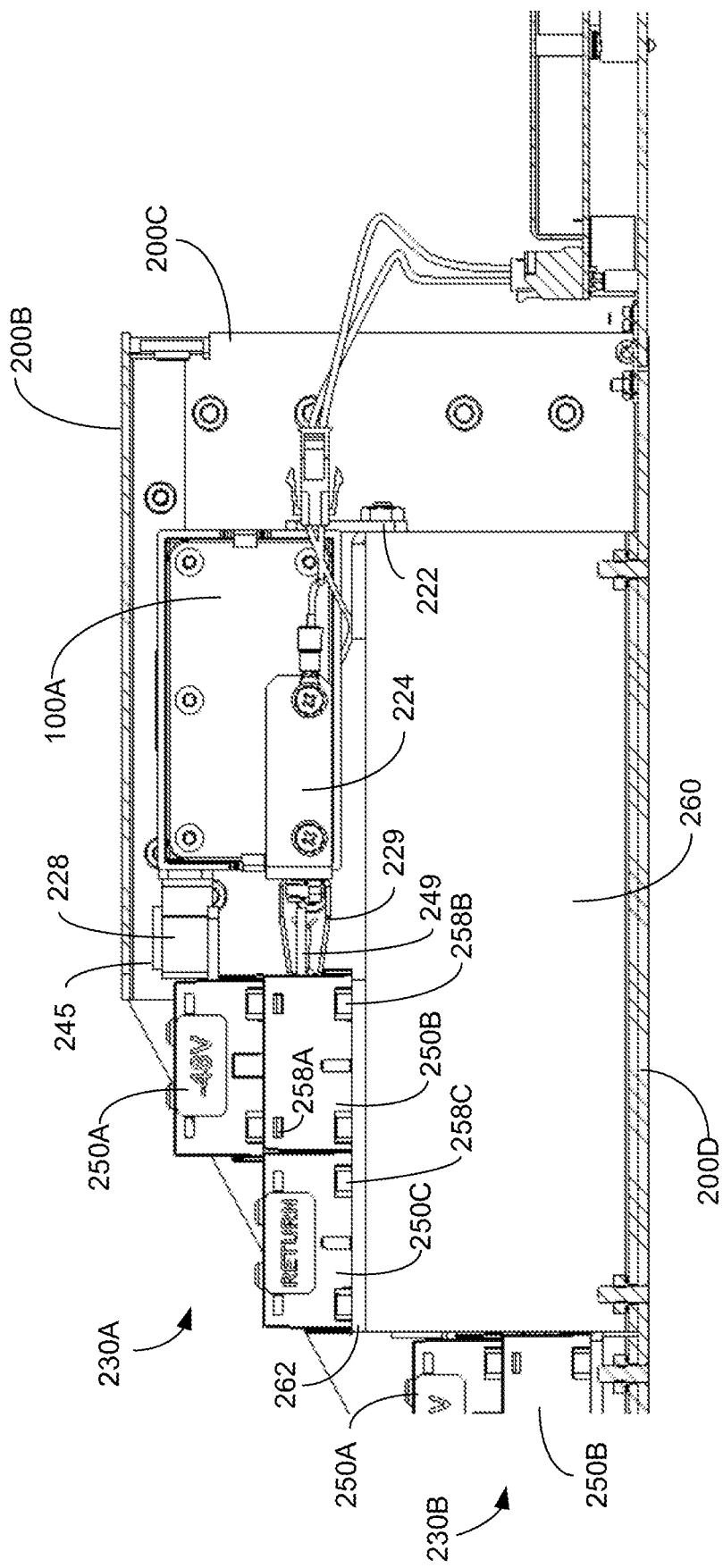
FIG. 12 shows a side view of the base suppression unit.

Clips 258B and 258C may clip into a bracket that attaches to support frame 260 (see FIG. 12). A slot, similar to slot 259C on retainer 250C, is formed on the back end of retainer 250B. A clip, similar to clip 256A on retainer 250A, is formed on the front end of retainer 250C and inserts up into the slot 259 formed on the back end of retainer 250B.

Terminal assemblies 230 are completely reconfigurable based on the number and location of suppression modules 100 in base suppression unit 40. All terminal assemblies 230 are detachable from connectors 228 and 229 on suppression modules 100. Upper terminal assemblies 230 can attach to lower terminal assemblies and two terminal assemblies 230 can be attached end to end to form a double lower terminal assembly.

FIG. 12 is a side sectional view of base suppression unit 40. Support frame 260 is mounted to bottom wall 200D of enclosure 200. Side wall 200C extends up along the side of support frame 260 and top wall 200B extends over the upper row of suppression modules 100A. The upper row of suppression modules 100A are mounted by ground bus bars 222 to the front top end of support frame 260.

Return bus bar 224 is attached to clip 229 that attaches around tab 249 of terminal plate 248 (FIG. 11). Clip 228 is attached to −48 bus bar 226 and clips over tab 245 of terminal plate 244. Clips 258B and 258C extend down from retainers 250B and 250C, respectively, and clip into a bracket 262 attached to the top of support frame 260. Another two rows of terminal assemblies 230B extend out from the back end of support frame 260.

Figure 13:
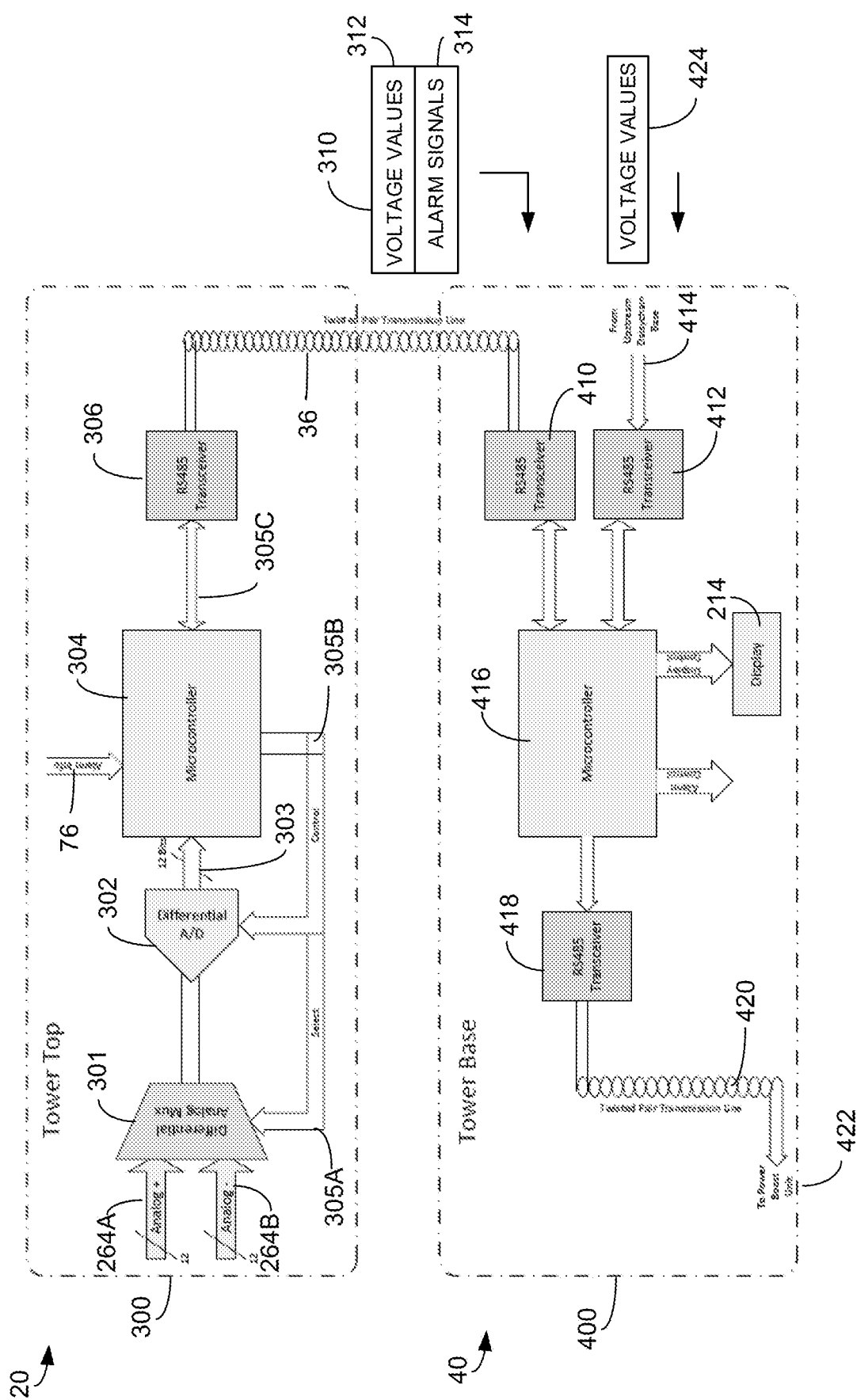
FIG. 13 shows a diagram of monitoring circuitry located in the remote suppression unit and the base suppression unit.

FIG. 13 is a circuit diagram showing monitoring circuitry located on the monitor boards in remote suppression unit 20 and base suppression unit 40. Monitor circuit 300 is located on monitor board 72 of remote suppression unit 20. Monitor circuit 300 communicates with monitor circuit 400 located on monitor board 216 in base suppression unit 40 via monitoring cable 36.

Analog voltage pairs include a −48V power line 264A and return power line 264B for each DC power line pair connected to remote suppression unit 20. Each analog power line pair 264A and 264B are connected to a resistor divider network and TVS protection in suppression modules 100. Each analog power line pair 264A and 264B is input as a differential pair into differential analog multiplexor 301. The output of analog multiplexor 301 is connected to the positive and negative inputs of a differential analog to digital converter (ADC) 302.

The digital output of ADC 302 is fed into a microcontroller/microprocessor 304 that controls multiplexor (mux) select lines 305A, ADC control lines 305B, and conversion result bus 305C. Microprocessor 304 selects a first DC voltage pair 264A and 264B by setting the appropriate mux select lines 305A. Microprocessor 304 delays by a fixed settling time and then signals ADC 302 to begin converting the analog voltage on selected analog pair 264A and 264B into a digital value.

Once the conversion is complete, ADC 302 interrupts microprocessor 304. Microprocessor 304 reads the converted voltage value on result bus 303 and stores the result in internal memory to compute an average voltage for that analog voltage pair 264 (channel). Microprocessor 304 then selects a next analog voltage pair/channel 264 using multiplexer select lines 305A and again waits for the analog signals to settle. Microprocessor 304 signals ADC 302 to begin the next conversion. ADC 302 again interrupts microprocessor 304 when the conversion is complete. Microprocessor 304 reads and stores the next digital result to compute an average for the next voltage pair 264. Microprocessor 304 repeats the above operations until digital readings are received and stored for each voltage pair 264.

Microprocessor 304 may repeat these operations N times independently summing results for each voltage pair 264. In another example, microprocessor 304 may sum the voltage values for a group of voltage pairs 264. When complete, microprocessor 304 has stored an accumulated sum of voltage samples for each DC power pair or channel. Microprocessor 304 then divides each accumulation by the number of samples to produce an average voltage measurement value 312. For the group of voltage pairs, microprocessor 304 may divide the accumulation by the number of samples for all of the voltage pairs in the group to produce an average voltage value for the group of voltage pairs.

Once average voltage measurements 312 are computed, microprocessor 304 reads the current alarm states 314 from alarm switches, such as intrusion switch 76. Microprocessor 304 forms a data packet 310 that includes the calculated average voltage values 312 and any alarm signals 314. Packet 310 is serially transmitted from microprocessor 304 to an isolated RS485 transceiver 306. RS485 transceiver 306 is connected to twisted pair wires 36 with a common reference signal that connects to monitor circuit 400 in base suppression unit 40.

As described above, base suppression unit 40 provides OVP functionality and distributes the DC power circuits from the tower base DC power plant 44 to DC power cables 30 that are routed to the top of tower 14 (see FIG. 1). DC voltages from the DC power cables 30 are tied together using diodes to create a common bus to monitor circuit 400. Monitor circuit 400 includes an isolated RS485 transceiver 410 that is connected to monitor circuit 300 at the top of tower 14 through twisted pair wires 36.

A microcontroller/microprocessor 416 in monitor circuit 400 is connected to RS485 transceiver 410. Microprocessor 416 reads the received serial data, reconstructs packet 310 transmitted by microprocessor 304, and validates packet 310 using an included checksum. If the checksum validation fails, packet 310 is discarded. Microprocessor 416 reads alarm information 314 and sets relays and indicators on display 214 for any detected alarms.

Microprocessor 416 collects voltage measurement data 312 from packet 310. Depending on the configuration, microprocessor 416 may rebuild packet 310 for outputting to a power boost unit 422. For example, power boost circuit 422 may increase the voltage levels on the DC power cables when measured voltage values 312 are below a given threshold.

One example power boost circuit is described in co-pending U.S. patent application, Ser. No. 15/875,795, entitled: POWER TRANSMISSION SYSTEM FOR WIRELESS COMMUNICATION SYSTEM, filed Jan. 19, 2018 which is herein incorporated by reference in its entirety.

Monitor circuit 400 may include a rotary switch (not shown) that generates an output address that directs packet 310 to power boost unit 422. Packet 310 is output over a twisted pair transmission line 420 using another isolated RS485 transceiver 418.

Monitor circuit 400 may include another (optional) RS485 input 414 (daisy chain input). Input 414 may receive data from one or more other base suppression units 40 that send packets 424 with associated voltage values to power boot unit 422. Monitor circuit 400 may retransmit data packets 424 from the upstream base suppression units on output lines 420. Each base suppression unit 40 may have a unique address that is attached to the associated packet 310 or 424.

Remote suppression unit 20 and base suppression unit 40 use integrated and configurable suppression modules 100 to support more DC power circuits within the same external or internal enclosures. Thus, suppression units 20 and 40 can provide voltage suppression for a larger number of remote radio units. New monitor circuit 300 also transfers voltage measurements from remote suppression unit 20 to base suppression unit 40. The additional space provided by suppression modules 100 allows base suppression unit 40 to also retain multiple optical fiber splitter modules 210.

Several preferred examples have been described above with reference to the accompanying drawings and pictures. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A remote suppression unit configured to connect to remote ends of DC power cables, comprising:
   surge suppression modules retaining one or more suppression devices, including first and second suppression devices; and
   an over voltage protection (OVP) board including power strips coupled to the surge suppression devices in the surge suppression modules,
   wherein a first set of the power strips are coupled to the first suppression devices, a second set of the power strips are coupled to the first and second suppression devices, and a third set of one or more ground power strips are coupled to the second suppression devices; and
   wherein an upper corner on a first end of the suppression modules extends over an end of the first set of power strips, a lower corner on the first end of the suppression modules extends over an end of the second set of the power strips, and a second opposite end of the suppression modules extends over the third set of ground power strips.

2. The remote suppression unit of claim 1, wherein the first and second set of power strips are aligned in first and second columns in alternating order.

3. The remote suppression unit of claim 1, including:
   a first set of bolts extending through the OVP board and the first set of the power strips and connecting to the first surge suppression devices; and
   a second set of bolts extending through the OVP board and the second set of power strips and connecting to the first and second surge suppression devices; and
   a third set of bolts extending through the OVP board and the third set of ground power strips and connecting to the second surge suppression devices.

4. The remote suppression unit of claim 1, wherein:
   a first one of the third set of ground power strips extends between a first side of the OVP board and a first column of the first and second set of power strips; and
   a second one of the third set of ground strips extends between a second opposite side of the OVP board and a second column of the first and second set power strips.

5. The remote suppression unit of claim 1, including terminal blocks connected to opposite ends of the first and second set of the power strips.

6. The remote suppression unit of claim 1, wherein the surge suppression modules have substantially flat rectangular shapes.

7. The remote suppression unit of claim 1, including:
   a vertically aligned wall supporting the OVP board;
   arms extending out from the wall; and
   a panel rotationally coupled to the arms and containing an fiber optic cable tray that retains fiber optic adapters for connecting to fiber optic cables.

8. The remote suppression unit of claim 1, wherein:
   a first set of the power strips are coupled to −48V DC conductors in the DC power cables; and
   a second set of the power strips are coupled to return conductors in the DC power cables.

9. A remote suppression unit configured to connect to remote ends of DC power cables, comprising:
   surge suppression modules retaining one or more suppression devices, including first and second suppression devices;
   an over voltage protection (OVP) board including power strips coupled to the surge suppression devices in the surge suppression modules; and
   a remote voltage monitor circuit configured to measure voltages on the remote ends of the DC power cables connected to the surge suppression modules and transmit the voltages to a base monitor circuit, wherein the remote voltage monitor circuit includes:
   an analog multiplexer (mux) coupled to the remote ends of the DC power cables;
   an analog to digital converter (ADC) coupled to the analog multiplexer;
   a microprocessor coupled between the ADC and a communication cable coupled to the base monitor circuit, the microprocessor configured to:
   control the mux to receive different analog voltages from the DC power cables;
   receive digital voltage values from ADC corresponding to the different analog voltages;
   format the digital voltage values into data packets; and
   send the data packets to the base monitor circuit.

10. The remote suppression unit of claim 9, wherein the microprocessor is further configured to:
    receive multiple digital voltage values for the remote ends of the same DC power cables;
    calculate an average voltage from the multiple digital voltage values; and
    send the average voltage in the packets to the base monitor circuit.

11. The remote suppression unit of claim 9, wherein the microprocessor is further configured to:
    receive alarm signals from alarm sensors located in the remote suppression unit;
    convert the alarm signals into digital alarm data; and
    transmit the digital alarm data to the base monitor circuit in the data packets.

12. A suppression unit configured to connect to local ends of DC power cables, the DC power cables including remote ends that connect to remote radio heads (RRHs), the suppression unit comprising:
    an enclosure;
    multiple surge suppression modules located within the enclosure including:
    one or more surge suppression devices,
    bus bars attached to the surge suppression devices,
    connectors attached to the bus bars; and
    a configurable terminal assembly attached to the connectors;

wherein a first one of the bus bars is configured to couple a first one of the surge suppression devices to a −48V power cable coupled to a first terminal in the terminal assembly; a second one of the bus bars is configured to couple the first one of the surge suppression devices and a second one of the surge suppression devices to a return power cable coupled to a second terminal in the terminal assembly, and a third one of the bus bars is configured to couple the second one of the surge suppression devices to ground; and wherein a first row of the surge suppression modules is: connected at front ends by the third one of the bus bars to a support frame in the enclosure, connected at back ends to a first row of terminals in the terminal assembly by the first one of the bus bars, and connected at the back ends to a second row of terminals in the terminal assembly by the second one of the bus bars.

13. The suppression unit of claim 12, including:
a second row of the surge suppression modules located below the first row of surge suppression modules, the second row of the surge suppression modules connected at front ends by the third one of the bus bars to a support frame or bracket, connected at back ends to a third row of terminals in the terminal assembly by the first one of the bus bars, and connected at the back ends to a fourth row of terminals in the terminal assembly by the second one of the bus bars.

14. The suppression unit of claim 12, including:
a first row of terminals in the terminal assembly detachably connected to a first one of the bus bars; and
a second row of terminals in the terminal assembly located below the first row of the terminals detachably coupled to a second one of the bus bars.

15. The suppression unit of claim 12, wherein the terminal assembly includes:
terminal strips configured to engage with the connectors attached to the bus bars; and
retainers each including a base and side walls that extend up from opposite sides of the base, the terminals strips seating onto the base in between the side walls.

16. The suppression unit of claim 15, including clips extending down from the retainers configured to attach to the side walls of a lower retainer or attach to a support frame or bracket in the enclosure.

17. The suppression unit of claim 15, wherein the retainers are detachably and reconfigurably stacked on top of each other, or attached end-to-end.

18. The suppression unit of claim 12, wherein the enclosure includes:
a first section containing the surge suppression modules; and
a second section containing optical fiber splitters.

19. The suppression unit of claim 18, wherein the second section contains multiple fiber optical modules that retain the optical fiber splitters and slidingly insert into the enclosure.

20. The suppression unit of claim 12, including a monitor circuit configured to:
receive voltage measurements from a remote voltage suppression unit, the voltage measurements identifying voltages at remote ends of the DC power cables; and
send the voltage measurements to a power boost unit to control the voltages at the remote ends of the DC power cables.

21. The suppression unit of claim 20, wherein the monitor circuit is further configured to:
receive voltage measurements from other suppression units connected to other DC power cables; and
forward the voltage measurements to the power boost unit.

22. The suppression unit of claim 20, wherein the monitor circuit is further configured to:
receive alarm signals from the remote suppression unit; and
display the alarm signals and the voltage measurements on a display located on the enclosure.

* * * * *